Patented Sept. 14, 1948

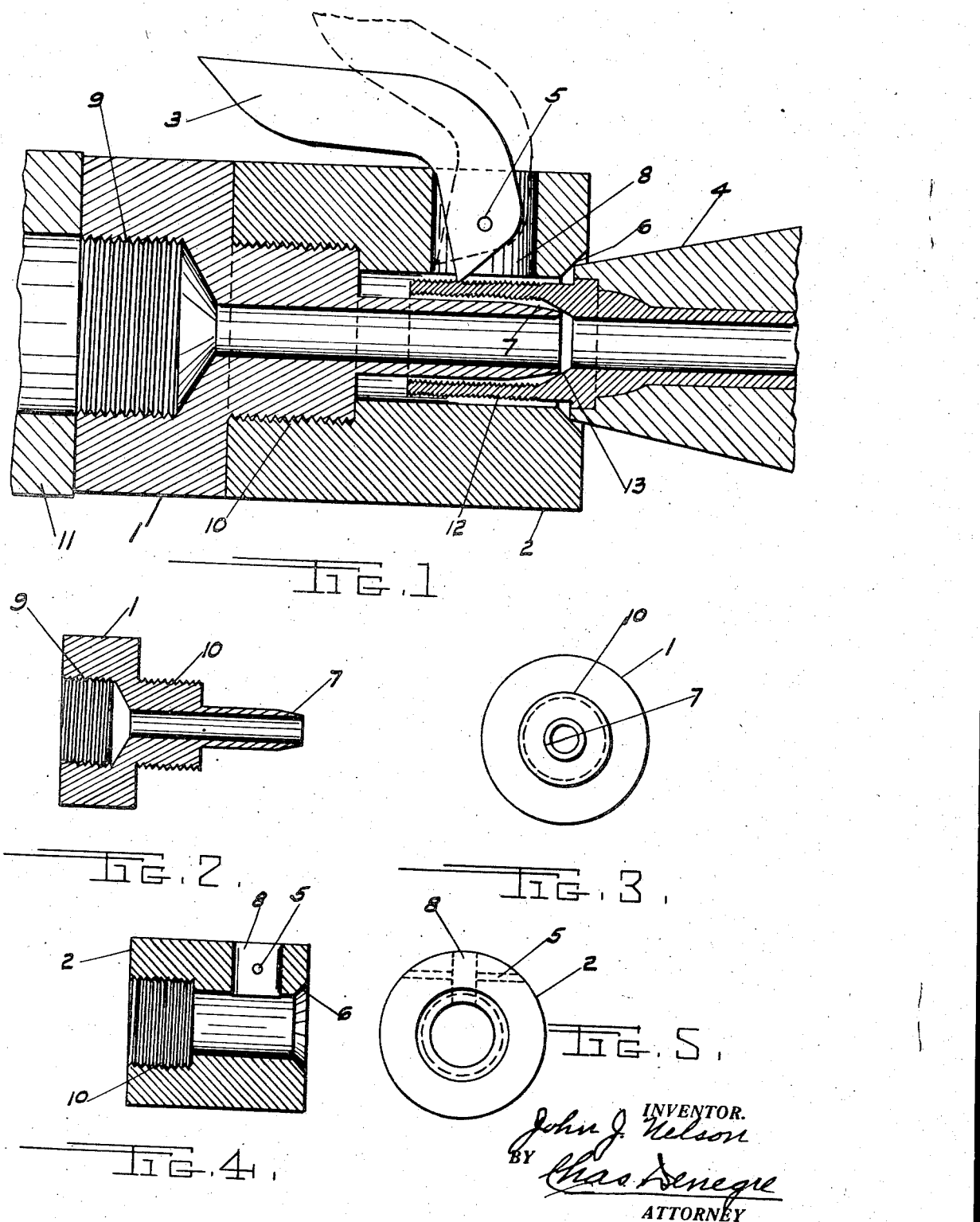

2,449,245

UNITED STATES PATENT OFFICE 2,449,245

AIR HOSE CONNECTION

John J. Nelson, Birmingham, Ala., assignor of one-half to T. J. Rozar, Birmingham, Ala.

Application April 15, 1946, Serial No. 662,356

2 Claims. (Cl. 285—170)

This invention relates to an improvement in an air hose connection or coupling, the main object being to provide a quick acting connection which may be readily and easily operated, and one which will securely hold the air hose attached to the tube or stem with which it is being used, without the use of gasket or washer. The present invention is an improvement over a similar device covered by my United States Patent Number 2,191,579 dated February 27, 1940.

Another object of the invention is to provide a connection especially designed for use in curing inner tubes for pneumatic tires, the connection being one which will insure the free passage of air to the valve and will also insure against leaks which usually cause a blast of air to be directed against the lug of the mold resulting in the cooling of the lug and the defective curing of the tube. Other objects and advantages will appear from the drawing and description.

Referring to the drawing, part of this application, it will be observed that Fig. 1 is a general longitudinal sectional view through the center of the connection and valve stem less valve core; Fig. 2 is a detail longitudinal sectional view through the center of the connection main part; Fig. 3 is an end view of Fig. 2; Fig. 4 is a detail longitudinal sectional view through part of the connection where retaining lever is positioned; Fig. 5 is an end view of Fig. 4.

Similar reference numerals refer to similar parts throughout the several views.

Referring to the drawing in detail it will be seen that the connection comprises two main members 1 and 2 that are removably attached to each other by a threaded joint 10. The member 1 has a beveled end 7 that is adapted to fit into and against the beveled wall portion 13 in the valve stem 4 from which the valve core has been removed. The valve stem 4 may also make contact with its outer edge where it touches 6 against the member 2 but this is not an air or steam tight joint. The small end portion of the valve stem 4 is usually made of brass and is provided with threads 12 to which a regular valve cap (not shown) is attached to keep dust and dirt out of the valve core (not shown) positioned regularly in the valve stem when the tube to which the stem is attached is in use. When the valve stem is being used on a tube being cured the valve core is removed and into its space the end 7 of member 1 is inserted to form an air or steam tight joint where the extreme end 7 makes contact with the beveled wall seat 13 in the stem which is standard in all modern valve stems. Carried in a slot 8 in the member 2 is a pointed curved lever 3 that is swingable on a shaft 5. As shown in Fig. 1 when the assembled connection is attached to the threaded end of the valve stem and pressed tightly to make contact between the end 7 and the beveled wall seat 13 the point of the lever 3, full line, seats between two adjacent threads on the valve stem and holds the beveled end 7 of the connection tight against the beveled seat 13 in the valve stem and thus makes an air or steam tight joint. To release the connection from the valve stem the pointed lever 3 is raised to the position shown by the dotted lines in Fig. 1. The assembled connection comprising members 1 and 2 is attached by threaded recess 9 to the air or steam hose 11 leading from a source of compressed air or steam not shown.

From the foregoing it will appear that in order to use the present connection the same is simply pushed upon the threaded end of the valve stem and it is automatically held tightly attached by the point of the lever between the threads.

This type of valve stem is also used on other rubber air or steam containers for the manufacture of tires and bags and similar articles. The present connection is intended for use wherever a non-washer or non-gasket air tight or steam tight joint is required to avoid trouble arising from high temperature heat that is necessary in the curing of rubber products.

The connection may be made of any material best suited for the purpose but I have found steel to be the most satisfactory.

While I have shown and described the preferred embodiment of my invention, I do not wish to limit same to the exact and precise details of structure, but reserve the right to make all modifications and changes so long as I remain within the spirit and scope of the following claims.

Having described my invention I claim:

1. An air hose connection of the class described comprising; two round metal members, one member having a comparatively large hole in one end and threads in the interior wall thereof, the threaded wall of the hole adapted to screw onto a threaded hose connector of corresponding size, the middle portion of the member being approximately half the diameter of the hole end portion, screw threads in the outer face of the middle portion, the other end portion being approximately one third the diameter of the middle portion and terminating in a beveled end, the beveled end being a size to fit into the beveled wall seat in a standard pneumatic tire tube valve stem with valve core removed, a hole of smaller diameter than the larger hole diameter and leading through the center of the middle and smaller end portions; the second metal member being round and having a comparatively large hole in the face of one end and screw threads in the interior wall thereof of a size to screw onto the middle threaded portion of the other metal member, a hole through the other portion of the second member, a slot in this hole leading through the second member, a curved lever mounted on a shaft attached within the slot, the lever having an integral V-shaped sharp end, the lever made of steel, the V point end of the lever adapted to fit between two threads on the outside of the end of a standard pneumatic tire tube stem when the stem is inserted in the hole in the member having the lever in the slot of the wall of the hole.

2. An air hose connection of the class described comprising; two round metal parts, one part having a comparatively large hole in one end and screw threads in its interior wall, the threaded wall of the hole adapted to screw onto a threaded hose connector of corresponding size, the middle portion of the part being approximately half the diameter of the hole end portion, screw threads in the outer face of the middle portion, the other end portion being approximately one third the diameter of the middle portion and terminating in a beveled end, the beveled end of a size to fit into the beveled wall seat in a standard pneumatic tire tube valve stem with valve core removed, a hole of smaller diameter than the larger hole diameter leading through the center of the middle and smaller end portions; the second metal part being round and having a comparatively large hole in the face of one end and screw threads in its interior wall of a size to screw onto the middle threaded portion of the other metal part, a hole through the other portion of the second part, a slot in this hole, a curved lever mounted on a shaft attached within the slot, the lever having an integral V-shaped sharp end, the lever made of hard metal, the V pointed end of the lever adapted to fit between two threads on the outside of the end of a metal article so threaded and of a diameter to snugly fit into the hole and adjacent the lever point protruding from the slot and into the edge of the hole to thus hold the article tightly within the hole.

JOHN J. NELSON.

REFERENCES CITED

The following references are of record in the file of this patent:

UNITED STATES PATENTS

| Number | Name | Date |
|---|---|---|
| 407,151 | Beck | July 25, 1888 |
| 2,191,579 | Nelson | Feb. 27, 1940 |